(12) United States Patent
Basler et al.

(10) Patent No.: US 9,316,507 B2
(45) Date of Patent: Apr. 19, 2016

(54) ANGULAR ENCODER AND DRIVE SYSTEM WITH AN ANGULAR ENCODER

(71) Applicant: SICK STEGMANN GMBH, Donaueschingen (DE)

(72) Inventors: Stefan Basler, Donaueschingen (DE); Reinhold Mutschler, Donaueschingen (DE); David Hopp, Donaueschingen (DE)

(73) Assignee: SICK STEGMANN GMBH, Donaueschingen (DE)

( * ) Notice: Subject to any disclaimer, the term of this patent is extended or adjusted under 35 U.S.C. 154(b) by 231 days.

(21) Appl. No.: 14/132,986

(22) Filed: Dec. 18, 2013

(65) Prior Publication Data

US 2014/0173920 A1  Jun. 26, 2014

(30) Foreign Application Priority Data

Dec. 21, 2012 (EP) .................................. 12199149

(51) Int. Cl.
*G01D 5/12* (2006.01)
*G01D 5/34* (2006.01)
*G01D 5/347* (2006.01)

(52) U.S. Cl.
CPC ............... *G01D 5/125* (2013.01); *G01D 5/34* (2013.01); *G01D 5/347* (2013.01); *G01D 5/12* (2013.01)

(58) Field of Classification Search
CPC ......... G01D 5/12; G01D 5/347; G01D 5/125; G01D 5/34
USPC ............................. 33/1 PT, 1 N, 534, 706–707
See application file for complete search history.

(56) References Cited

U.S. PATENT DOCUMENTS 5,066,857 A * 11/1991 Ernst ........................ G01D 5/36
                                                           250/231.15
5,880,586 A *  3/1999 Dukart ................... G01R 33/077
                                                           324/207.2

(Continued)

FOREIGN PATENT DOCUMENTS

DE            3926799 A1   2/1991
DE      202004010921 U1    9/2004

(Continued)

OTHER PUBLICATIONS

European Search Report dated Nov. 28, 2014 corresponding to application No. 12199149.1-1558.

*Primary Examiner* — R. A. Smith
*Assistant Examiner* — Tania Courson
(74) *Attorney, Agent, or Firm* — Nath, Goldberg & Meyer; Jerald L. Meyer; Christopher Thomas (57) ABSTRACT

The invention relates to an angular encoder (10) for monitoring the angular position of a rotating shaft (32), with a modulator (34) which can be positioned on the rotating shaft in order to provide a signal which changes as a function of the angular position of the rotating shaft (32), and with a receiver (22) for the reception of the signal which changes as a function of the angular position of the rotating shaft (32), in which the receiver (22) and the modulator (34) are positioned in such a way as to be thermally insulated from each other, so that the transfer of heat from the modulator (34) to the receiver (22) is impeded, while thermal insulation is achieved at least in part by a thermally insulating separator (35), which is positioned between the modulator (34), on the one hand, and the transmitter (21) and/or the receiver (22), on the other hand.

The invention further relates to a drive system (100) with an angular encoder (110) of the type described.

10 Claims, 4 Drawing Sheets

(56) References Cited

U.S. PATENT DOCUMENTS

| | | | | |
|---|---|---|---|---|
| 5,886,519 A * | 3/1999 | Masreliez | G01B 3/205 | |
| | | | 324/207.17 | |
| 5,894,678 A * | 4/1999 | Masreliez | G01B 3/1061 | |
| | | | 324/207.24 | |
| 6,399,940 B1 * | 6/2002 | Cui | G01D 5/3473 | |
| | | | 250/231.13 | |
| 6,429,647 B1 * | 8/2002 | Nicholson | G01D 5/145 | |
| | | | 324/207.2 | |
| 6,958,600 B1 * | 10/2005 | Affaticati | G01D 11/245 | |
| | | | 324/174 | |
| 7,292,028 B2 * | 11/2007 | Hahn | G01D 5/145 | |
| | | | 324/207.21 | |
| 7,321,231 B2 * | 1/2008 | Hayashida | G01B 3/18 | |
| | | | 324/66 | |
| 7,466,125 B2 * | 12/2008 | Heinze | G01D 5/145 | |
| | | | 324/207.21 | |
| 8,552,675 B2 * | 10/2013 | Asahi | G01D 5/145 | |
| | | | 318/400.38 | |
| 2004/0252032 A1 * | 12/2004 | Netzer | G01D 11/245 | |
| | | | 340/870.37 | |

FOREIGN PATENT DOCUMENTS

| | | |
|---|---|---|
| GB | 2 054 995 A | 2/1981 |
| JP | 58041313 A | 3/1983 |

* cited by examiner

ANGULAR ENCODER AND DRIVE SYSTEM WITH AN ANGULAR ENCODER

Angular encoders are devices for monitoring the angular position of a rotating shaft and are well-known to the prior art. In particular, they have a modulator which is positioned on the rotating shaft and which provides a signal that changes as a function of the angular position of the rotating shaft, and they have a receiver for receiving the signal which changes as a function of the angular position of the rotating shaft. Known in particular are magnetic, optical, inductive, and capacitive angular encoders, which exist in a variety of different embodiments.

Angular encoders are employed in a variety of different work environments, particularly ones where there may be a thermal load on the angular encoder. A concrete example of this is the functional monitoring of motors, particularly electro-motors, which have an angular encoder that permits the motor to be controlled through the monitoring of collected data. Particularly advantageous here is a monitoring system that, in spatial terms, is positioned directly on the motor. Very popular in actual practice, therefore, are drive systems consisting of such a motor, with an angular encoder directly installed into the electro-motor. In addition to systems manufactured as a complete device which can be immediately assembled in its entirety, there are also kit versions, where angular encoder modules are prefabricated by a distributor and are then mounted in the motor by the motor manufacturer.

In today's systems two different classes of encoders, in particular, are employed: resolvers and mechatronic systems. In the case of resolvers, it is a matter of electromechanical components which form a set of transformers based copper wire and mechanical structural elements. In contrast, mechatronic systems are to be understood as encoders which contain electronic modules in addition to mechanical structural elements. The use of electronic modules means that mechatronic systems offer a much greater functional range than resolvers and are noticeably more efficient.

The fact that resolvers retain their market position as motor feedback systems despite the clear superiority of mechatronic systems must attributed to the former's high tolerance for temperature loads. In motor operation, particularly in the operation of high-performance motors, there is often a significant temperature increase in the motor, including the motor shaft and motor shield. As a rule, the electronic components which are used in today's mechatronic encoders are suited for operation in motors whose motor temperature does not exceed 125° C. When the motor has a higher operating temperature the probability of failure rises significantly.

Known from GB 2 054 995 A is an optical encoder arrangement in which the transmitter and the receiver are connected to a modulator via an optical fiber, and a combined optical fiber is used in order to reduce the number of optical fibers and prevent the attenuation of the signals.

Known from U.S. Pat. No. 6,399,940 B1 is an optical encoder which is optimally designed with respect to thermal influences, particularly heat-conditioned deformation, which can lead to an imprecise measurement. To this end, the mirror sensor elements are positioned in a block for the cooling housing and two active coolers are positioned in a cooling element.

The goal of the invention is to provide an improved angular encoder which is suitable for applications in which a high thermal load may arise, as well as to provide a drive system using such an angular encoder.

This goal is achieved by an angular encoder with the features of claim 1 and by a drive system with the features of claim 8.

Advantageous embodiments and elaborations of the invention are the subject matter of the secondary claims.

As specified by the invention, the angular encoder for monitoring the angular position of a rotating shaft has a modulator which is positioned on the rotating shaft and which provides a signal which changes as a function of the angular position of the rotating shaft. The angular encoder also has a receiver for the reception of the signal which changes as a function of the angular position of the rotating shaft. It is essential to the invention that the receiver and the modulator are positioned in such a way as to be thermally insulated from each other, so that heat transfer from the modulator to the receiver is impeded. This measure confers an advantage in that the components, particularly the electronic components which are part of the receiver, necessarily have a lower temperature resistance than has previously been the case.

In one advantageous elaboration the angular encoder expediently has an electronic control unit with which at least the receiver—and as a further option, a transmitter, if one is present—can be controlled and/or read. Because the electronic control unit and the modulator are so positioned as to be thermally insulated from each other, thereby ensuring that heat transfer from the modulator to the electronic control unit is impeded, the above-mentioned advantage is also carried over to this electronic control unit.

An advantageous elaboration of the invention specifies that the receiver and the electronic control unit are designed as a common structural unit. This may be achieved specifically by positioning both components on the same circuit board. This measure confers an advantage in that the specifications demanded by the employed electronic components are uniform, a fact which facilitates the circuit's design.

For angular encoders which also have a transmitter whose signal is modulated by the modulator—as is particularly the case with optical encoders which, e.g., employ light polarization for determining the momentary angular position—it is particularly advantageous if the transmitter and the modulator are also positioned so as to be thermally insulated from each, thereby impeding heat transfer from the modulator to the receiver. The result is that the electronic components belonging to the receiver also have a lower temperature resistance than heretofore. In this case, it is then expedient if at least the receiver, transmitter, and electronic control unit are designed as a combined group of components, in order to unify at a basic level the requirements for the electronic components. It is particularly effective if the electronic control unit contains all the electronic components of the angular encoder.

A concrete possibility (which taken by itself does not belong to the invention) for realizing the thermal insulation is to provide a calculated amount of space between the modulator, on the one hand, and the transmitter and/or the receiver and/or the electronic control unit, on the other hand, and particularly to provide spatial separation with the goal of maximizing the distance between the given component and the modulator.

In realizing the thermal insulation, an alternative or additional possibility according to the invention is to position a thermal insulator in the form of a thermally insulating separator between the modulator, on the one hand, and the transmitter and/or the receiver and/or the electronic control unit, on the other hand. Here it is important that the thermal insulator is transparent relative to the modulated signal and/or a signal transmitted by any transmitter that is present.

It has also proven to be advantageous to provide a cooling element which is in thermal contact with the electronic control unit and/or the transmitter and/or the receiver.

It must be emphasized that the invention can be applied to all known angular encoders, independent of whether they require a separate transmitter, as, e.g., with a polarizing encoder, or whether they have a modulator which represents the actual signal source for the receiver, as, e.g., with magnetic encoders.

The drive system according to the invention comprises a motor, which has, as is customary with motors, a rotor and a drive shaft by means of which a device is driven by the motor. In particular, the motor in question may advantageously be an electromotor. The drive shaft can be formed by the rotor itself or it may be designed as a separate component to which rotor revolutions are transmitted, as is customary, e.g., in geared motors.

The drive system also has an angular encoder according to the invention—that is, an angular encoder for monitoring the angular position of a rotating shaft, with a modulator positioned on the rotating shaft in order to provide a signal that changes as a function of the angular position of the rotating shaft; and with a receiver for receiving the signal that changes as a function of the angular position of the rotating shaft. Here the receiver and the modulator are positioned in such a way as to be thermally insulated from each other, so that the transfer of heat from the modulator to the receiver is impeded. This measure confers an advantage in that the components, particularly the electronic components belonging to the receiver, require a lower temperature resistance that has been the case in the past.

The angular encoder can be integrated into the motor, which as a rule means it is delivered as a kit and is installed in the motor by the motor manufacturer. Or it may be attached to the motor as an independent structural unit.

Here the electronic components of the angular encoder in its embodiment as a mechatronic encoder are positioned by preference on the transmitter and the receiver. This can mean that the transmitter and the receiver are formed by components so designed that the signals transmitted by the transmitter are guided by those components positioned on the transmitter and/or that the signals received by the receiver are processed by those components positioned on the receiver.

A specific consequence of this may be that the modulator is not an active module for which a signal transmitted by the receiver [sic] is processed by electronic components. Preferred is a passive component which modifies the signal being modulated by means of physical effects arising from the reciprocal action of the signal and the modulator.

A particularly preferred embodiment of the mechatronic angular encoder, furthermore, provides a transmitter, modulator, and receiver that are positioned in a reflexive arrangement. This means specifically that, in contrast to a transmission design in which the modulator is positioned between the transmitter and the receiver, the transmitter and receiver are positioned on the same side of the modulator and that the signal emitted by the transmitter is modulated by the modulator and directed back to the receiver.

A concrete example of an angular encoder designed in this manner as a mechatronic receiver is represented by an optical encoder which operates on the basis of polarized light. Here the modulator is formed by a reflector which has a polarizing element and rotates with the rotor, such that the modulator is either illuminated with polarized light that is then modulated with respect to its intensity and is reflected onto the receiver; or is illuminated with unpolarized light that is then modulated with respect to its polarizing direction and is reflected onto a receiver positioned behind a polarization analyzer.

The modulator may be positioned directly on the rotor, or indirectly, i.e., using a plurality of connecting elements. Receiver and transmitter are thermally insulated from each other. Since the modulator itself does not require any electronic components, it can be exposed to higher temperatures without the risk of damage when a sufficient thermal insulation is ensured by the design of the angular encoder which is incorporated in the mechatronic system in the form of a mechatronic encoder.

There are a number of starting points available to achieve this thermal insulation. On one hand, the thermal insulation can be achieved, at least in part, through spatial separation, specifically through maximizing the spatial separation. This means that in designing the drive system, and particularly the angular encoder, as large a distance as possible should be sought between the modulator, on one side, and the transmitter and receiver, along with electronic components connected with them, on the other side.

One concrete measure for maximizing the spatial separation consists in positioning the receiver and the transmitter on a motor cover opposite the drive shaft.

On the other hand, the thermal insulation between the modulator, on one side, and the transmitter, receiver, and electronic components connected to them, on the other side, can be improved by positioning a thermal, non-modulating insulator between the modulator, on one side, and the transmitter and receiver, on the other side—where the thermal, non-modulating insulator is transparent with respect to the transmitted and modulated signal. In this patent, a thermal insulator is understood to be a material with a heat conductivity that is less than 1.5 W/(m K). By way of a concrete example, for optical encoders based on polarization and operating on the principle described above, the space between the modulator, on one side, and the transmitter and receiver, on the other side, can be filled with glass or optical plastics, either entirely or in part.

In general, these measures can be further supported by providing the drive system with a housing which is manufactured from a thermally insulating material, i.e., a thermal insulator, at least in that section of the housing that at least partially encloses the modulator, as well as the transmitter and the receiver, of the angular encoder designed as a mechatronic encoder.

Finally, in achieving a particularly efficient protection of the electronic components of the angular encoder, it has proven advantageous to provide a cooling element which is in thermal contact with the transmitter and/or receiver.

To provide a better understanding of the invention, concrete exemplary embodiments are discussed below on the basis of the figures. Shown are.

Identical parts of the exemplary embodiments of the invention are designated with identical reference symbols in all the figures, unless otherwise noted.

Figure 1A:
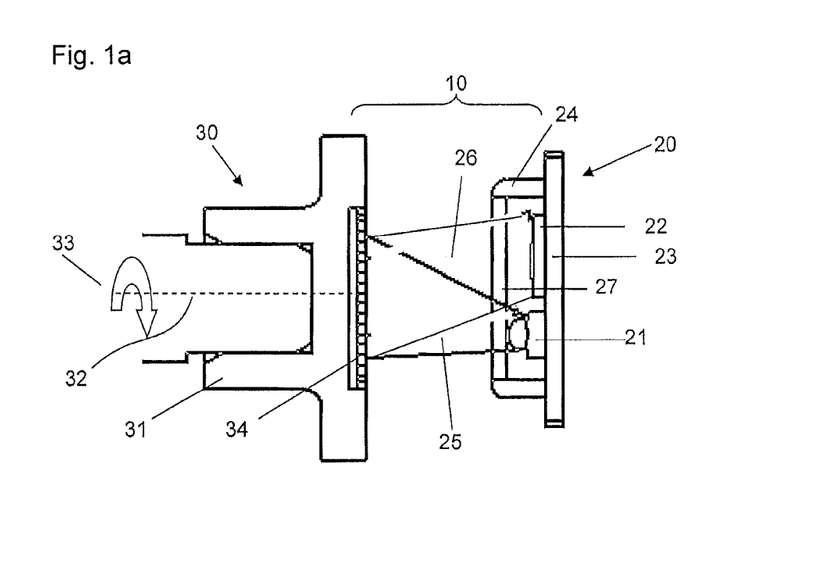
FIG. 1a the construction of an angular encoder shown by the example of an optical angular encoder based on polarization and having a reflexive design, FIG. 1b a drive system according to one exemplary embodiment of the invention, in which an angular encoder operating on the principle shown in FIG. 1a is installed as a kit, FIG. 1c the construction of an optical angular encoder according to the invention following the principle of FIG. 1a, with a thermally insulating separator, FIG. 2a the construction of an angular encoder with a thermal separator for a magnetic angular encoder, FIG. 2b a drive system according to one exemplary embodiment of the invention, in which an angular encoder operating according to the principle shown in FIG. 2a is installed as a kit, FIG. 3a the construction of an angular encoder with a thermal separator for a capacitive or inductive rotary encoder, and FIG. 3b a drive system according to one exemplary embodiment of the invention, in which an angular encoder operating according to the principle shown in FIG. 3a is installed as a kit.

FIG. 1a shows the construction of an angular encoder 10, using the example of a kit (i.e., a construction set) for an optical angular encoder based on polarization. The angular encoder 10 has a sensor module 20 and a modulator module 30. The sensor module 20 comprises a transmitter 21, which is designed as a light source and can be realized, e.g., in the form of a LED; and a receiver 22, which is designed as an optical receiver and can be realized, e.g., in the form of photodiodes having, in particular, polarizing structures which are integrated monolithically. The transmitter 21 and the receiver 22 are positioned together on a printed circuit board 23, along with other, optional electronic components. The transmitter 21 and the receiver 22 are furthermore enclosed in a housing 24 that is also positioned on the circuit board 23. This housing 24 has a transparent design relative to the direction of light 25 emitted by the transmitter 21 serving as a light source and relative to the direction of incident light 26 illuminating the receiver 22. Both transmitter and receiver are located behind an optically transparent element 27. The light emitted by the transmitter 21 or detected by the receiver 22 has a predetermined direction of polarization, which in the depicted example is achieved by using a receiver 22 that takes the form of photodiodes with polarizing structures. These are integrated monolithically and therefore cannot be seen in the figure. It is understood that the polarizers in front of the transmitter 21 or the receiver 22 may take other forms.

The modulator module 30 has a supporting element 31, which can be set into rotation by a shaft 32 mounted in a bearing 51, as indicated by the arrow 33 in FIG. 1a. The shaft 32 can either be the shaft whose rotation is being monitored or a shaft that is coupled to the shaft that is being monitored.

Positioned on the supporting element 31 is a modulator 34, which is designed as a polarizer and which selects from the light 25 that is emitted by the transmitter 31 and that illuminates the modulator 34 those components having the linear polarization that corresponds to the momentary angular position of the modulator 34, reflecting those components in the direction toward the receiver 22 as light 26 illuminating the receiver. When the modulator 34 rotates with the shaft 32, the linear polarizing direction selected by the modulator 34 rotates along with it.

The momentary rotating angle of the shaft 32 mounted in the bearing 51 can be determined in this way, inasmuch the intensity of the light detected by the receiver 22 varies as a function of the momentary position of the modulator 34. More specifically, it varies between a minimum that is achieved when the direction of linear polarization that is predetermined by the polarization structures monolithically integrated into the receiver 22 of the depicted embodiment is perpendicular to the polarization direction selected by the modulator 34 in its momentary angular position and a maximum that is achieved when the direction of linear polarization that is predetermined by the polarization structures monolithically integrated into the receiver 22 is parallel to the polarization direction selected by the modulator 34 in its momentary angular position.

Figure 1B:
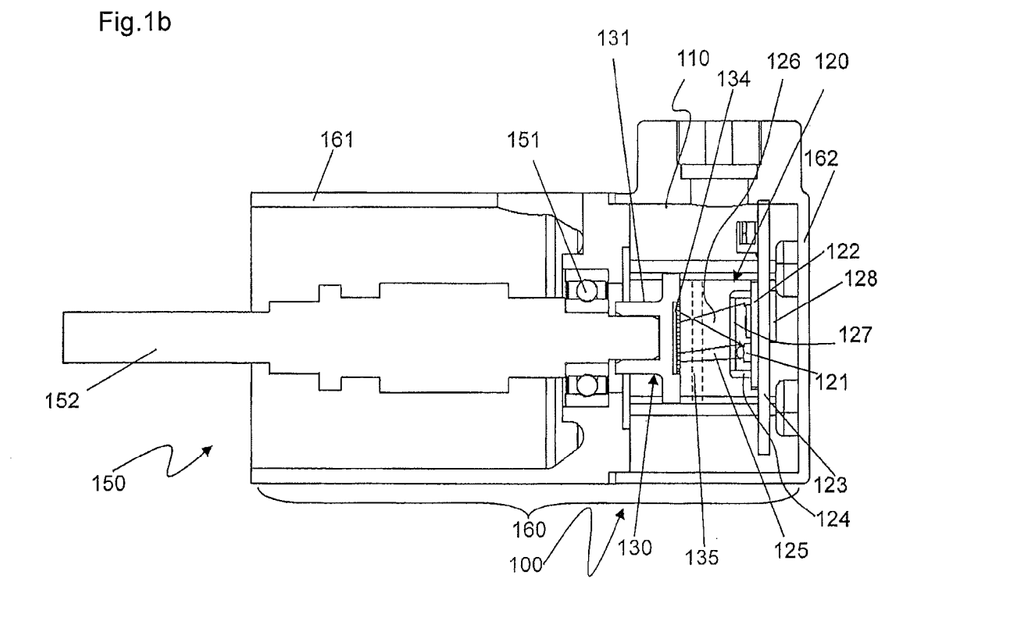

FIG. 1b shows a drive system 100 according to one exemplary embodiment of the invention, into which a mechatronic encoder, or angular encoder, is installed according to the principle represented in FIG. 1a.

The drive system 100 comprises a motor 150, which in particular can take the form of an electromotor and which has an angular encoder 110 that takes the form of a mechatronic encoder, which is integrated into or onto the motor 150.

The angular encoder 110 has a sensor module 120 with a transmitter 121 in the form of a light source; a receiver 122 in the form of an optical receiver; a printed circuit board 123; a housing 124 that is transparent in the illuminating direction of the light 125 emitted by the transmitter 121 serving as light source and that is transparent in the direction of the incident light 126 illuminating the receiver 122; and an optically transparent element 127. The receiver 122 here is designed, e.g., in the form of photodiodes with polarizing structures that are monolithically integrated and are therefore not identifiable in the figure.

In addition, the angular encoder 110 has a modulator module 130 with a supporting element 131, on which is positioned a modulator in the form of a polarizer.

The construction and function of the angular encoder 110 basically correspond to the construction and function of the angular encoder explained above on the basis of FIG. 1a.

The motor 150 has a rotor 152 that is mounted in rotating fashion on a bearing 151 and that simultaneously forms the drive shaft in the present embodiment. Positioned on the end of the rotor 152 opposite the drive shaft is the supporting element 131 with the modulator 134 of the modulator module 130 belonging to the angular encoder 110—so that upon rotation of the rotor 152 the modulator 134 also rotates. For the sake of clarity, the stator, which naturally is also present in the motor 150, is not shown in FIG. 1b.

The motor 150 and the encoder arrangement are received in a two-part housing 160, with a first housing part 161 and a second housing part 162. Here the first housing part 161 basically encompasses the rotor 152 and the stator, and the second housing part 162 encompasses the area of the angular encoder, which is designed as a mechatronic encoder.

Essential aspects relating to the especially high thermal resistance of this exemplary embodiment of a drive system 100 are:

the fact that a non-modulating thermal insulator 135, which is made of glass or optical plastic and which is transparent with respect to the transmitted and modulated signal, is positioned in the space between the sensor module 120 and the modulator 130. Glass or optical plastic has a heat conductivity of less than 1.5 W/(m K), is transparent to light, and does not change the latter's polarization. As a result the modulator module 130 will indeed heat up when the motor 150 and particularly the rotor 152 heat up, but the heat is barely conducted to the sensor module 120, which contains the electronic components of the angular encoder 110, the realization of an arrangement in which the distance between the sensor module 120 and the modulator module 130 is as large as possible, the provision of a cooling element 128 on the sensor module 120, and the choice of a material with a heat conductivity of less than 1.5 W/(m K), e.g., glass or optical plastic for the second housing part 162, which also counteracts the transport in the direction of the sensor module 120 of heat arising from the motor.

Figure 1C:
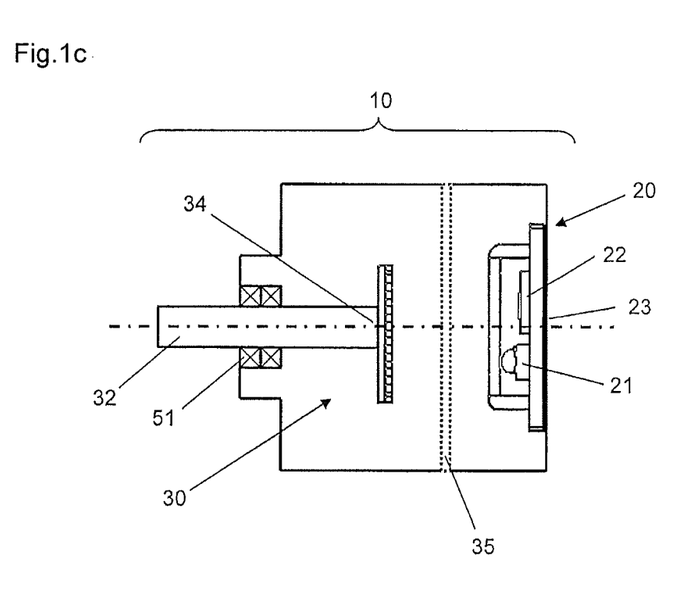

FIG. 1c shows an angular encoder in the form of a device which operates according to the principle of the kit of FIG. 1a, in which a thermal separator 35 is also provided.

Figure 2A:
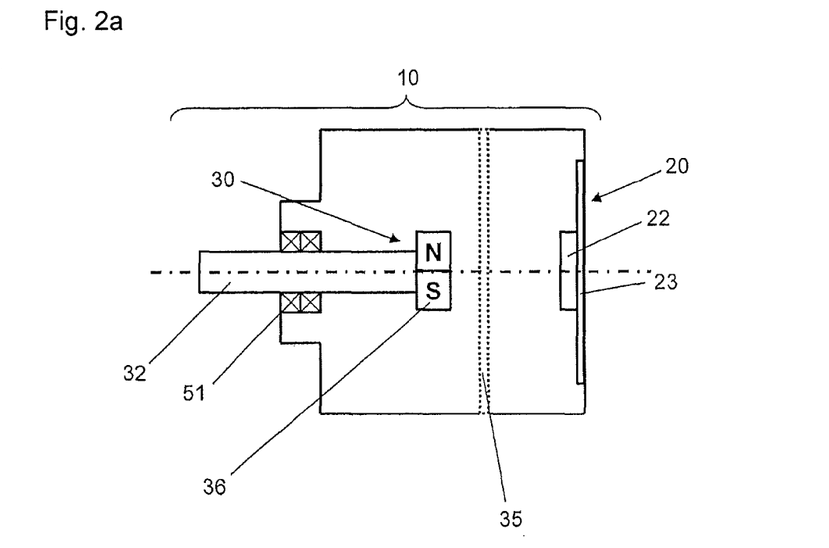

The mechanical angular encoder shown in FIG. 2a differs from the embodiment of FIG. 1c in that the modulator positioned in the modulator module 30 is a magnet 36 and the receiver 22 is a sensor for detecting the position in space of the magnetic field produced by the magnet 36.

Figure 2B:
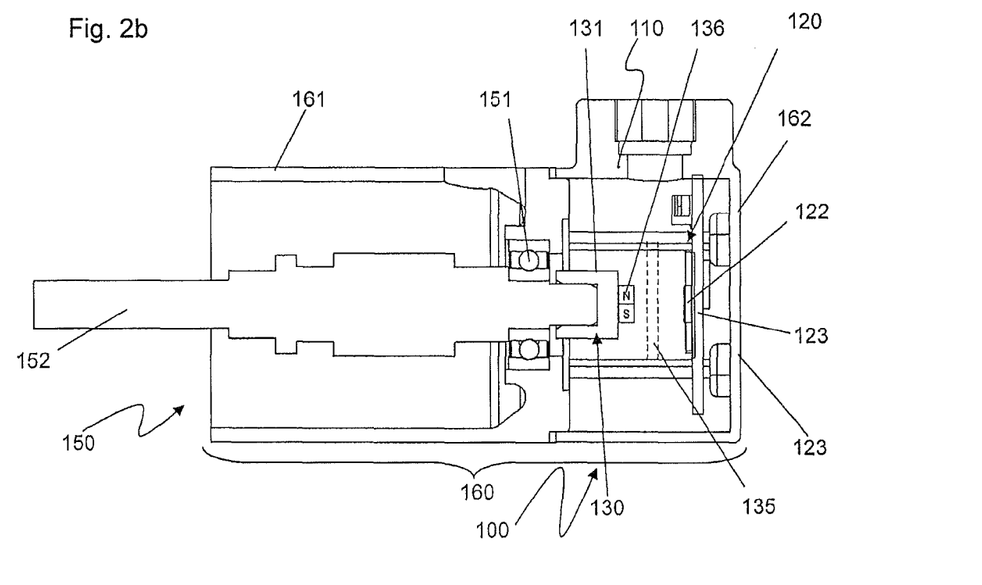

The drive system 100 shown in FIG. 2b differs from that shown in FIG. 1b only in that an angular encoder delivered as a construction set or kit and operating according to the principle of the angular encoder shown in FIG. 2a is used instead of an angular encoder kit according to FIG. 1a—so that the modulator positioned in the modulator module 130 is a magnet 136 and the receiver 122 is a sensor for detecting the position in space of the magnetic field produced by the magnet 136.

Figure 3A:
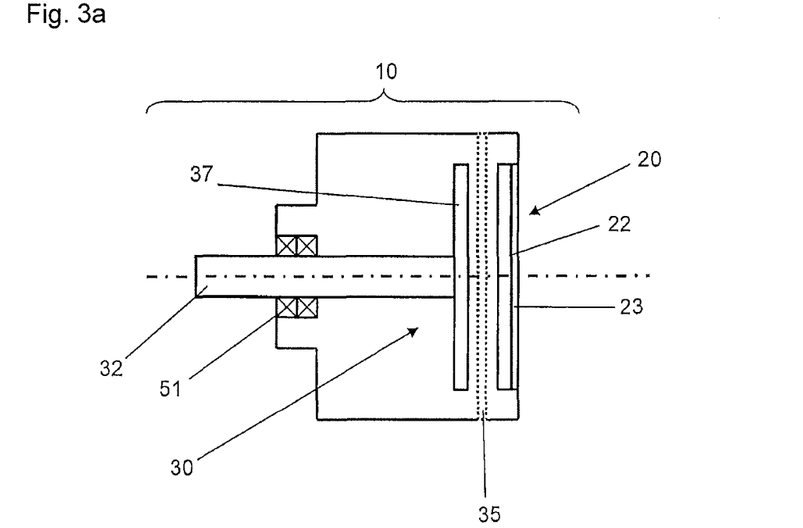

The capacitive angular encoder shown in FIG. 3a differs from the embodiment of FIG. 1c in that the modulator positioned in the modulator module 30 is a capacitor plate with a modulating structure 37 and the receiver 22 is a second, segmented capacitor plate. With a similar design an angular encoder operating according to an inductive principle can also be produced. Here a circuit board 37 with, e.g., coils is provided in place of the capacitor plate.

Figure 3B:
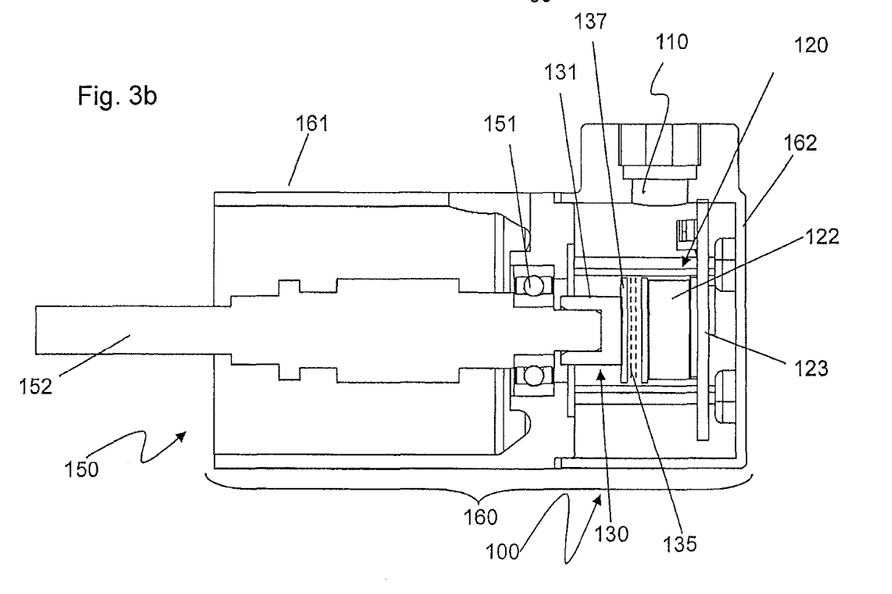

The drive system 100 shown in FIG. 3b differs from that shown in FIG. 1b only in that an angular encoder in accordance with FIG. 3a, delivered as a construction set or kit and designed as either a capacitive angular encoder or an inductive angular encoder, is used instead of an angular encoder according to FIG. 1c—so that the modulator positioned in the modulator module 30 is a capacitor plate with a modulating structure 137 and the receiver 122 is a second, segmented capacitor plate.

LIST OF REFERENCE SYMBOLS

10 angular encoder
110 mechatronic encoder
20, 120 sensor module
21, 121 transmitter
22, 122 receiver
23, 123 printed circuit board
24, 124 housing
25, 125 light
26, 126 light
27, 127 optically transparent element
30, 130 modulator module
31, 131 supporting element
32 shaft
33 arrow
34, 134 modulator
35, 135 thermally insulating separator
36, 136 magnet
37, 137 capacitor plate/circuit board
51, 151 bearing
100 drive system
150 motor
152 rotor
160 housing
161 first housing part
162 second housing part

The invention claimed is:

1. Angular encoder (10) for monitoring the angular position of a rotating shaft (32), with a modulator (34) which can be positioned on the rotating shaft in order to provide a signal which changes as a function of the angular position of the rotating shaft (32), and with a receiver (22) for the reception of the signal which changes as a function of the angular position of the rotating shaft (32),
wherein
the receiver (22) and the modulator (34) are positioned in such a way as to be thermally insulated from each other, so that heat transfer from the modulator (34) to the receiver (22) is impeded, while thermal insulation is achieved at least in part by a thermally insulating separator (35), which is positioned between the modulator (34), on the one hand, and the transmitter (21) and/or the receiver (22), on the other hand, and which is transparent relative to the modulated signal and/or the transmitted signal.

2. Angular encoder (10) according to claim 1,
wherein
the angular encoder (10) has an electronic control unit with which at least the receiver (22) can be controlled and/or read, and the electronic control unit and the modulator (34) are positioned in such a way as to be thermally insulated from each other, so that heat transfer from the modulator (34) to the electronic control unit is impeded.

3. Angular encoder (10) according to claim 1,
wherein
the receiver (22) and the electronic control unit are designed as a combined structural unit.

4. Angular encoder (10) according to claim 1,
wherein
the angular encoder (10) has a transmitter (21) whose signal is modulated by the modulator (34), and the transmitter and the modulator (34) are positioned in such a way as to be thermally insulated from each other, so that the transfer of heat from the modulator (34) to the transmitter (21) is impeded.

5. Angular encoder (10) according to claim 4,
wherein
at least the receiver (22), the transmitter (21), and the electronic control unit are designed as a combined structural unit.

6. Angular encoder (10) according to claim 1,
wherein
the electronic control unit contains all the electronic components of the angular encoder (10).

7. Angular encoder (10) according to claim 1,
wherein
there is provided a cooling element which is in thermal contact with the electronic control unit and/or the transmitter (21) and/or the receiver (22).

8. Drive system (100) with a motor (150), which has a rotor (152) and a drive shaft by means of which a device is driven by the motor (150), and with an angular encoder (110) according to claim 1, which is installed in the motor (150) or mounted on the motor (150).

9. Drive system (100) according to claim 8,
wherein
the electronic control unit and/or the receiver (122) and/or the transmitter (121) are positioned on a motor cover lying opposite the drive shaft or on some other attachment lying opposite the drive shaft.

10. Drive system (100) according to claim 8, wherein
the drive system (100) has a housing which is produced of a thermally insulating material, at least in the portion of it that at least partially encloses the modulator (134), as well as the transmitter (121) and the receiver (122) of the angular encoder (110).

* * * * *